US011619874B2

(12) United States Patent
Vandewall et al.

(10) Patent No.: US 11,619,874 B2
(45) Date of Patent: Apr. 4, 2023

(54) DRY MIST PARTITION

(71) Applicant: The Boeing Company, Chicago, IL (US)

(72) Inventors: Cynthia Anne Vandewall, Cincinnati, OH (US); Jared Arthur Bowen, Lynnwood, WA (US); Juan Sebastian Ramirez Loaiza, Cincinnati, OH (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/446,231

(22) Filed: Aug. 27, 2021

(65) Prior Publication Data

US 2023/0067005 A1 Mar. 2, 2023

(51) Int. Cl.
*G03B 21/60* (2014.01)
*G03B 21/608* (2014.01)
*B64D 11/00* (2006.01)

(52) U.S. Cl.
CPC ........ *G03B 21/608* (2013.01); *B64D 11/0023* (2013.01)

(58) Field of Classification Search
CPC ...... H04N 9/31; H04N 9/3141; H04N 9/3152; G03B 21/56; G03B 21/562; G03B 21/567; G03B 21/608; F25C 3/00; F25C 3/02; F25C 3/04; G09G 3/003; G09G 3/004; G09G 3/006; B64D 11/0023; B64D 11/0038
See application file for complete search history.

(56) References Cited

U.S. PATENT DOCUMENTS

| 9,073,640 | B2 | 7/2015 | Mosler et al. | |
| 2010/0321478 | A1* | 12/2010 | Sliwa | G03B 21/562 348/51 |
| 2011/0285964 | A1* | 11/2011 | Reichow | F25C 3/00 239/14.2 |
| 2013/0308064 | A1* | 11/2013 | LaDuke | H04N 9/3194 348/744 |
| 2014/0362347 | A1 | 12/2014 | Oel | |
| 2017/0283065 | A1 | 10/2017 | Papke et al. | |
| 2021/0070448 | A1 | 3/2021 | Nguyen et al. | |

FOREIGN PATENT DOCUMENTS

| EP | 0503289 A1 | 9/1992 |
| KR | 20190060748 A | 6/2019 |

OTHER PUBLICATIONS

European Patent Office Extended Search Report, dated Jan. 3, 2023, regarding Application No. EP22192394.9, 9 pages.

* cited by examiner

*Primary Examiner* — Sultan Chowdhury
(74) *Attorney, Agent, or Firm* — Yee & Associates, P.C.

(57) ABSTRACT

A visual partition system is provided. The system comprises a number of dry mist dispensers that generate a particle curtain comprising liquid micro-droplets. A gutter system collects liquid from the particle curtain, and at least one vacuum extractor is operably coupled to the gutter system. A liquid recirculation system collects liquid from the gutter system via the at least one vacuum extractor and returns it to the dry mist dispensers for reuse of the liquid.

**

```
                         ┌───────┐
                         │ START │
                         └───┬───┘
                             ▼
         ┌──────────────────────────────────┐
  602 ─  │   GENERATE PARTICLE CURTAIN      │
         │   FROM DRY MIST DISPENSERS       │
         └────────────────┬─────────────────┘
                          ▼
         ┌──────────────────────────────────┐
  604 ─  │   PROJECT LIGHT ON PARTICLE      │
         │   CURTAIN TO RENDER              │
         │   PARTICLE CURTAIN OPAQUE        │
         └────────────────┬─────────────────┘
                          ▼
                       ╱ 606 ╲
                      ╱       ╲     NO
                     ╱MODIFYING╲────────┐
                     ╲ CONTROL ╱        │
                      ╲ INPUT?╱         │
                       ╲     ╱          │
                        ╲ YES           │
                         ▼              │
         ┌──────────────────────────┐   │
  608 ─  │   MODIFY LIGHT PROJECTION│   │
         └────────────┬─────────────┘   │
                     ◄─────────────────┘
                     ▼
         ┌──────────────────────────┐
  610 ─  │   COLLECT LIQUID FROM    │
         │   PARTICLE CURTAIN       │
         └────────────┬─────────────┘
                      ▼
         ┌──────────────────────────┐
  612 ─  │   FILTER COLLECTED LIQUID│
         └────────────┬─────────────┘
                      ▼
                   ╱ 614 ╲     NO    ┌───────────────────────────┐
                  ╱   OFF  ╲─────────│ RECIRCULATE COLLECTED LIQUID│
                  ╲ SIGNAL?╱         │ BACK TO DRY MIST DISPENSERS │
                   ╲      ╱          └──────────────┬────────────┘
                    ╲ YES                          616
                     ▼
                   ┌─────┐
                   │ END │
                   └─────┘
```

FIG. 6

DRY MIST PARTITION

BACKGROUND INFORMATION

1. Field

The present disclosure relates generally to airplane cabins, and more specifically, to generating a dry mist onto which light is projected to create an opaque visual barrier to divide sections of an airplane cabin.

2. Background

Space within an airplane cabin is valuable and limited. Airlines look for ways to squeeze additional value out of limited space while maintaining some semblance of separation and privacy for those onboard. Current methods for creating this perception are physical in nature, including elements such as doors, screens, partitions and curtains. Typically, curtains or other dividers are used to separate seating classes. Doors are used on some premium suites, and curtains close off the galley areas.

Therefore, it would be desirable to have a method and apparatus that take into account at least some of the issues discussed above, as well as other possible issues.

SUMMARY

An illustrative embodiment provides a visual partition system. The system comprises a number of dry mist dispensers that generate a particle curtain comprising liquid micro-droplets. A gutter system collects liquid from the particle curtain, and at least one vacuum extractor is operably coupled to the gutter system. A liquid recirculation system collects liquid from the gutter system via the at least one vacuum extractor and returns it to the dry mist dispensers for reuse of the liquid.

Another illustrative embodiment provides an airplane cabin partition system. The system comprises a frame connected to an interior of an airplane cabin and a number of water dispensers connected to the frame, wherein the water dispensers dispense a dry mist curtain. A light projector renders the dry mist curtain opaque by projecting light onto the dry mist. A gutter system coupled to the frame and collects water from the dry mist, and at least one vacuum extractor is operably coupled to the gutter system, such that the dry mist curtain is generally contained within an area defined by the frame. A water recirculation system collects water from the gutter system via the at least one vacuum extractor and return it to the water dispensers for reuse of the water.

Another illustrative embodiment provides a method for creating a partition in an airplane cabin. The method comprises generating a particle curtain from a number of dry mist dispensers and projecting light on the particle curtain with a light projector to render an opaque particle curtain. Liquid from the particle curtain is collected and recirculated back to the dry mist dispensers.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 depicts a flowchart illustrating a process of creating a visual partition in an airplane cabin in accordance with an illustrative embodiment;

DETAILED DESCRIPTION

Figure 1:
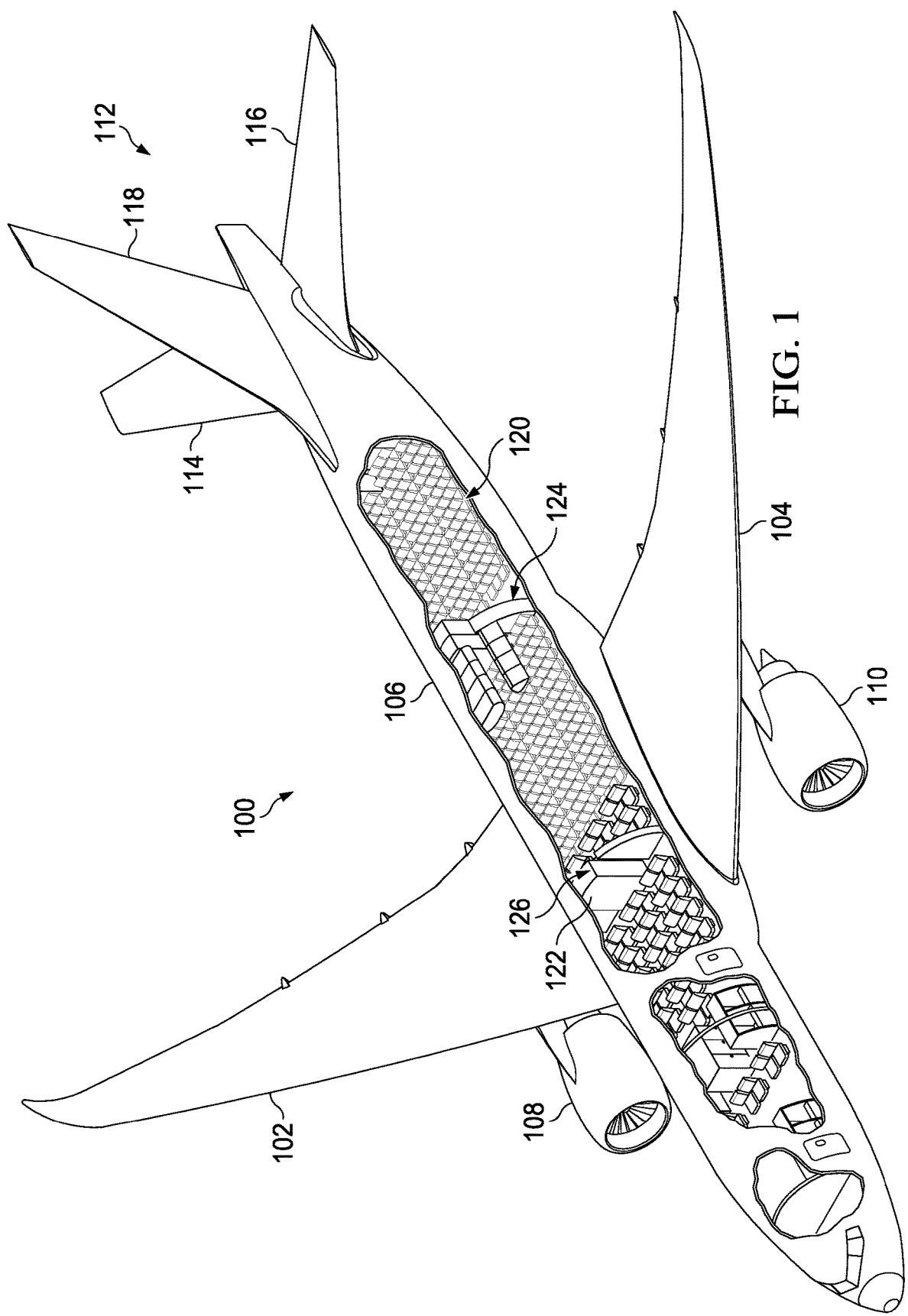
FIG. 1 is an illustration of an aircraft in which an illustrative example may be implemented.

The illustrative embodiments recognize and take into account one or more different considerations. The illustrative embodiments recognize and take into account that space within an airplane cabin is valuable and limited. Airlines look for ways to squeeze additional value out of limited space while maintaining some semblance of separation and privacy for those onboard.

The illustrative embodiments recognize and take into account that current methods for creating this perception are physical in nature, including elements such as doors, screens, partitions and curtains. The illustrative embodiments recognize and take into account that such physical dividers can become barriers to egress and have the potential to present liabilities in emergency situations, forcing them to be stowed in open configurations for taxi, takeoff, and landing.

The illustrative embodiments recognize and take into account that physical dividers add weight, are difficult to move or reconfigure, and can be damaged over time. Physical dividers also cannot be easily modified or rebranded, generating waste as old components are thrown out and new ones installed.

The illustrative embodiments provide dry mist dispensers that create a curtain of liquid micro-droplets on which light can be projected. These dry mist dispensers utilize a technology that atomizes water in particles less than 10 microns in diameter (approximately ⅓ of a fog particle). The sensation generated is completely dry to the touch, meaning people can safely walk through the mist without harm, temporarily breaking the mist particles and projected images. The dry mist partition framework houses a system that collects the dispensed mist using a gutter system and extractors that create a vacuum. The captured water is then filtered and cleaned before it is circulated back to the source.

The partition system includes a projector that uses light to render the dry mist opaque, completing the perceived visual division. Both images and video can be projected to further enhance the experience by communicating the state of the flight or other brand-centric content. Alternatively, solid colors can be projected onto the mist. Connection to the airplane enables the system to be logically controlled so that the dry mist partition automatically stops during take-off, landing, or emergencies.

The dry mist partition can also be used as a communication tool, clearly identifying when a space is "closed" or "off limits." For example, flight attendants can close off galley spaces with clear messaging that creates privacy and provides a retreat during flight. During airplane boarding, this dry mist "wall" generates an enhanced passenger experience upon entry by closing off unsightly cabin features such as galleys and potentially providing a greeting or welcome sign.

Unlike current solutions that have to be physically moved, the dry mist partition may be turned on and off by a touchless-control (e.g., gesture) interface, requiring no physical exertion by the operator. For example, flight attendants might move their arms to turn the mist dispensers and the projected light on and off.

With reference now to the figures, and in particular, with reference to FIG. 1, an illustration of an aircraft is depicted in accordance with an illustrative example. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which particle curtain partitions can be used to divide different sections and compartments within passenger cabin 120 in body 106. Passenger cabin 120 might comprise a number of sections such as first class, business class, and economy. These sections are separated by bulkheads 122, 124 that include passageways 126 allowing movement between different sections of passenger cabin 120.

Dry mist partitions may be mounted on bulkheads 122, 124 within passageways 126 to provide privacy between cabin sections as well as for other sections of passenger cabin 120 such galley areas.

Figure 2:
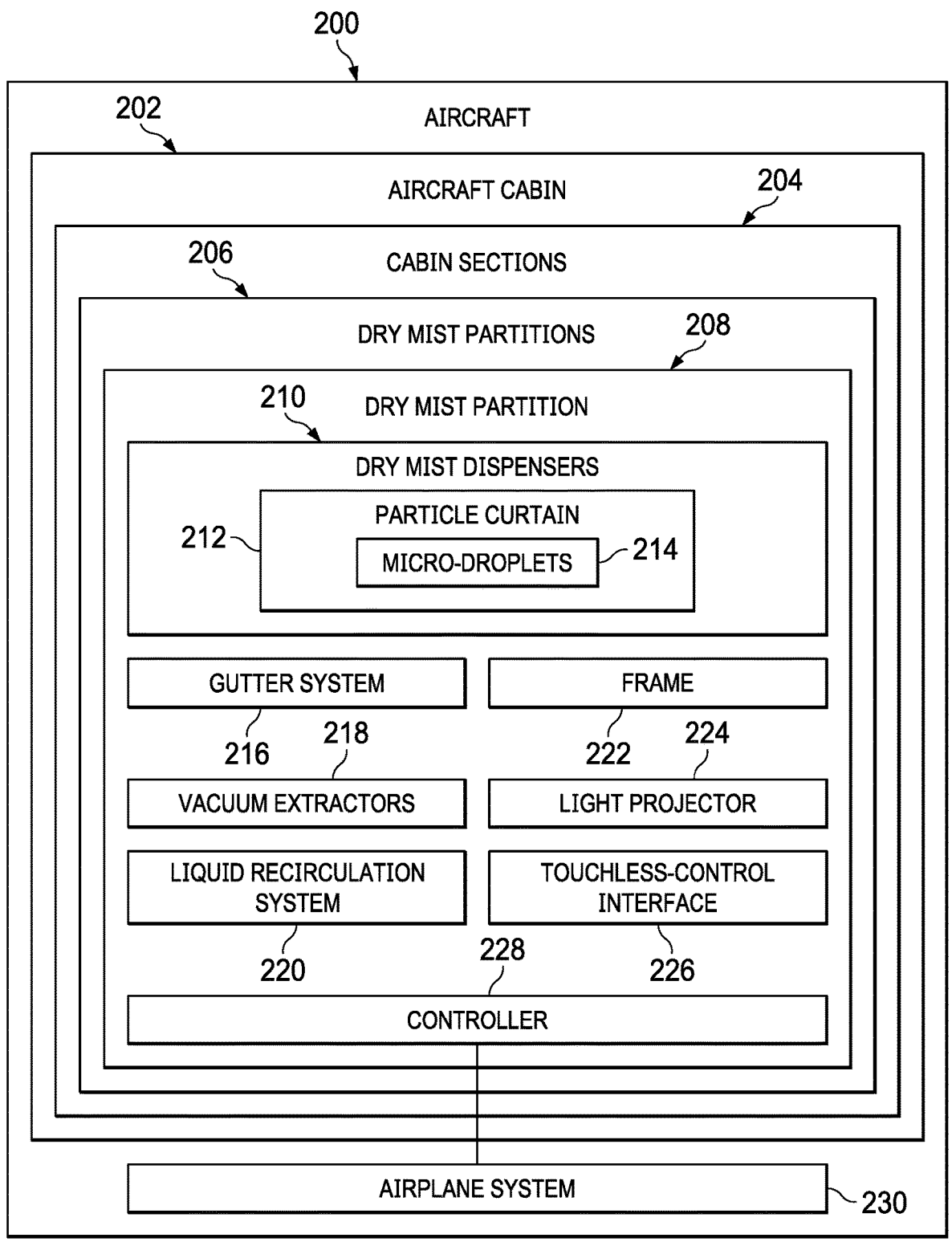
FIG. 2 depicts a block diagram illustrating a dry mist partition for use in an airplane cabin in accordance with an illustrative embodiment.

FIG. 2 depicts a block diagram illustrating a dry mist partition for use in an airplane cabin in accordance with an illustrative embodiment. Aircraft 200 may be an example of aircraft 100 shown in FIG. 1 and contain an aircraft cabin 202 such as passenger cabin 120.

Aircraft cabin 202 may be divided into a number of cabin section 204 by respective dry mist partitions 206. Each dry mist partition 208 comprises a number of dry mist dispensers 210, which generate a dry mist particle curtain 212 comprising micro-droplets 214. Dry mist dispensers 210 may be connected to frame 222, which provides the boundaries of particle curtain 212.

Gutter system 216 is connected to frame 222 and collects the liquid from the particle curtain 212. Vacuum extractors 218 coupled to gutter system 216 also collect liquid and help to generally contain the dry mist within frame 222. Liquid recirculation system 220 recirculates liquid collected by gutter system 216 and vacuum extractors 218 back to the dry mist dispensers 210.

Light projector 224 projects light onto particle curtain 212, which renders the dry mist visually opaque, appearing for all intents and purposes as a solid barrier. Light projector 224 may be configured to project a solid color (which might change during different phases of flight) or specific images or video onto the particle curtain 212 (see FIG. 5A).

Dry mist partition 208 is controlled by controller 228. Controller 228 may be activated by touchless-control interface 226, which allows a user to control light projector 224 and turn dry mist partition 208 on and off. Touchless-control interface 226 enables control of the system without physical contact, such as when the user's hands are full. Example of touchless control include hand gestures, breaking an infrared beam, facial recognition, and voice control. Controller 228 also controls liquid recirculation system 220 onboard aircraft 200.

Controller 228 may also be communicatively coupled to an airplane system 230 of aircraft 200 for controlling dry mist partition 208 based on at least one flight characteristic (e.g., turning dry mist partition 208 off during particular flight phases).

Figure 3:
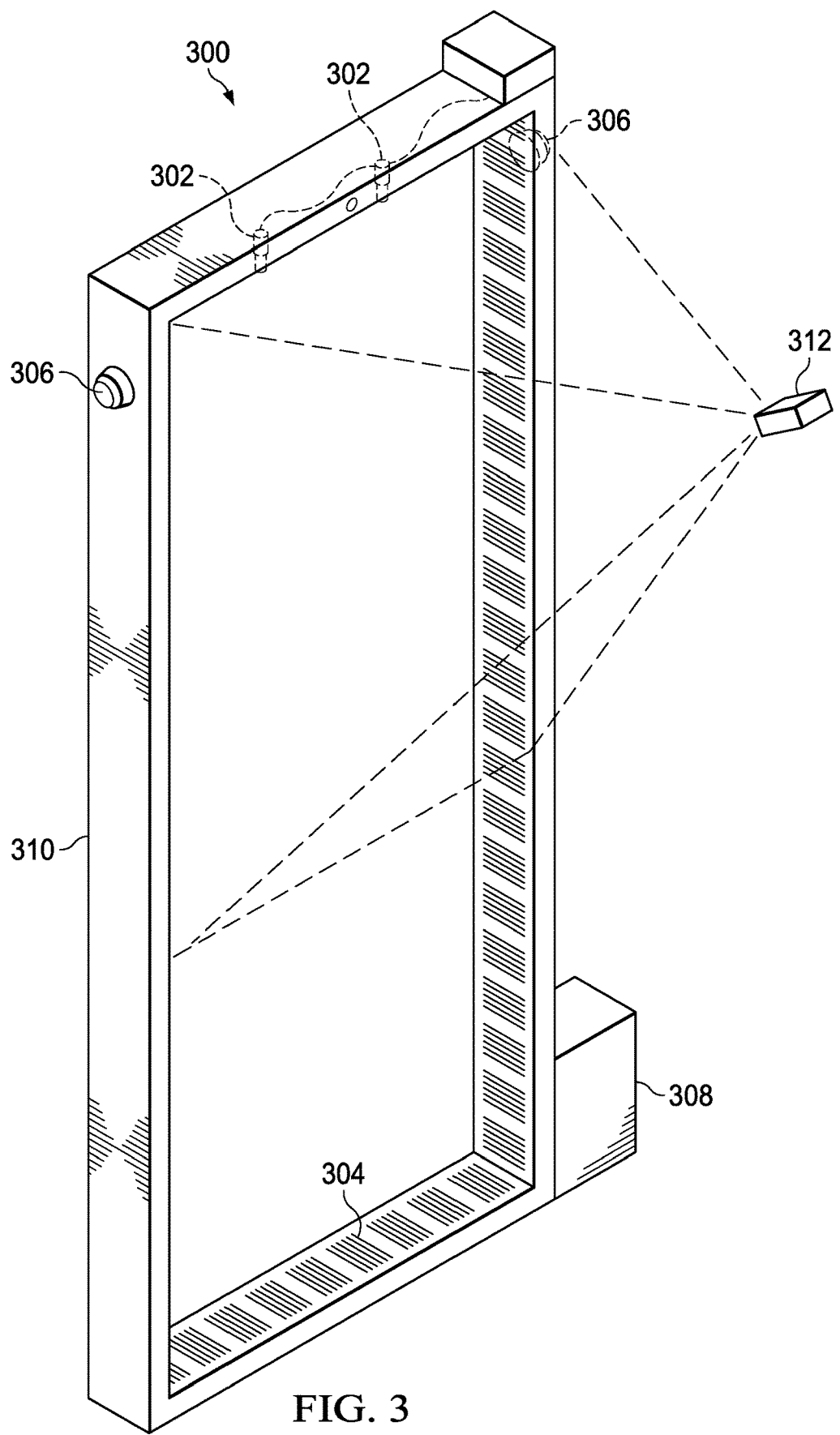
FIG. 3 depicts a perspective view of a dry mist partition in accordance with an illustrative embodiment.
Figure 4:
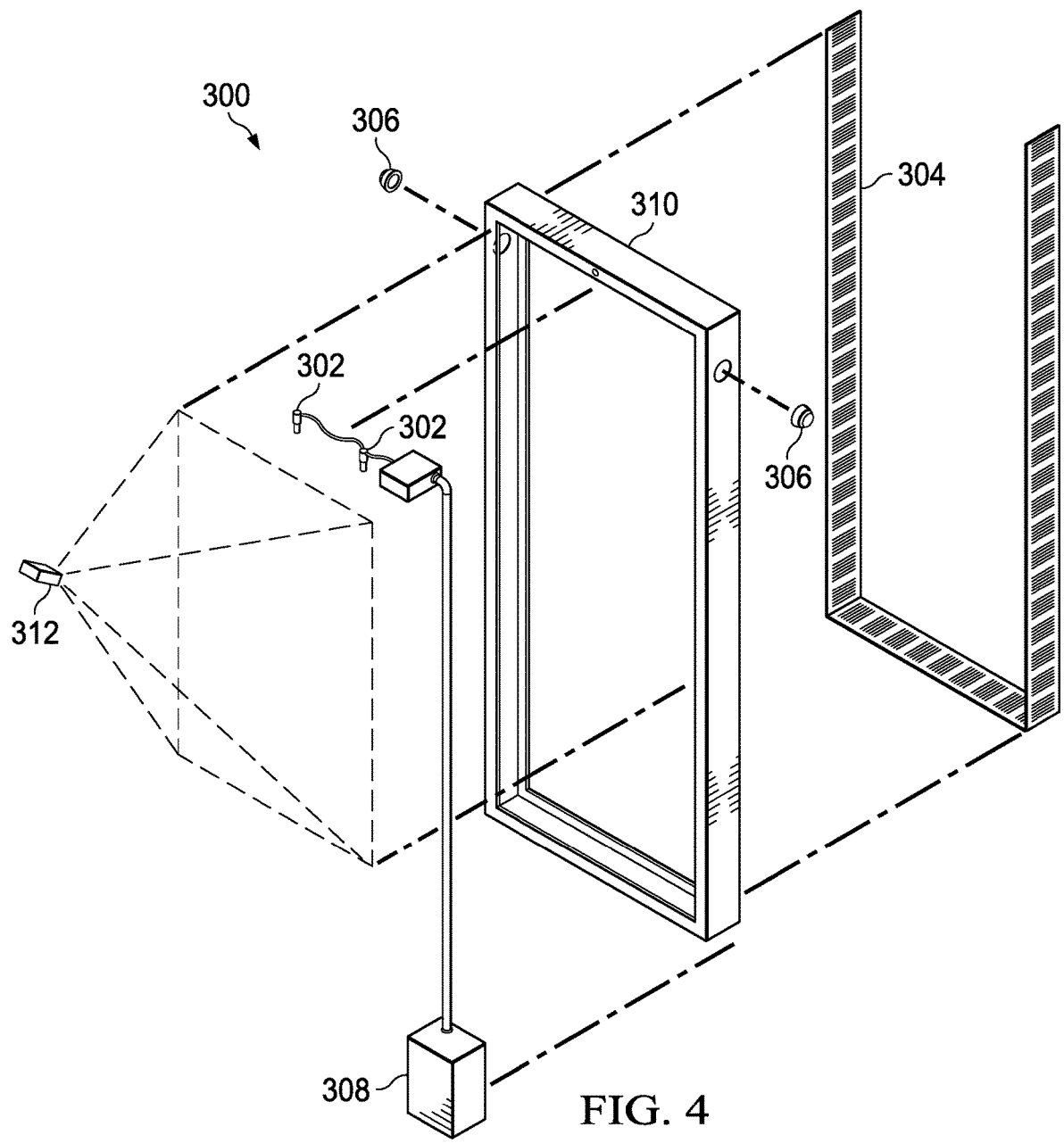
FIG. 4 depicts an exploded view of a dry mist partition in accordance with an illustrative embodiment.

FIG. 3 depicts a perspective view of a dry mist partition in accordance with an illustrative embodiment. FIG. 4 depicts an exploded view of a dry mist partition in accordance with an illustrative embodiment. Dry mist visual partition 300 is an example of dry mist partition 208 in FIG. 2.

Dry mist visual partition 300 comprises a number of dry mist dispensers 302 that generate a particle curtain comprising liquid micro-droplets less than ten microns in diameter. A gutter system 304 is configured to collect liquid (water) from the dry mist particle curtain. Vacuum extractors 306 are operably coupled to the gutter system 304.

Frame 310 supports the dry mist dispensers 302, gutter system 304, and vacuum extractors 306 such that the particle curtain is generally contained within an area defined by the frame 310 when in operation. Frame 310 is detachably connected to the interior of an airplane cabin. For example, frame 310 may be detachably connected to a bulkhead dividing the airplane cabin into different sections, wherein the particle curtain forms a visual barrier between different sections of the aircraft cabin.

Water recirculation system 308 is configured to collect liquid from the gutter system 304 via vacuum extractors 306 and return it to the dry mist dispensers 302 for reuse of the liquid.

Light projector 312 renders the dry mist particle curtain opaque by projecting light onto the dry mist. Light projector 312 may be configured to project colored light on the particle curtain render a colored particle curtain. Alternatively, light projector 312 may also be configured to project an image or video on the particle curtain to render a graphical dry mist curtain. Light projector may be further configured to modify the light color or graphical dry mist curtain based on at least one flight characteristic of the aircraft on which the visual partition system is installed.

Figure 5A:
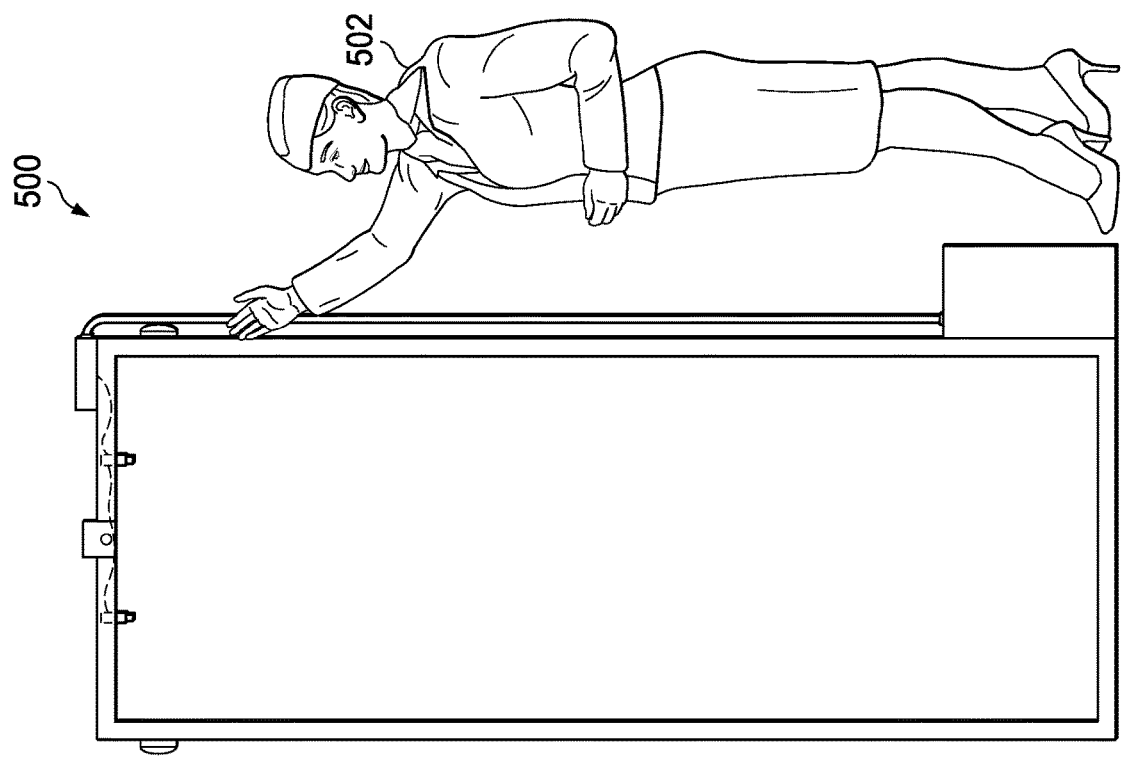
FIG. 5A depicts a dry mist partition with an image projected on the mist in accordance with an illustrative embodiment.
Figure 5B:
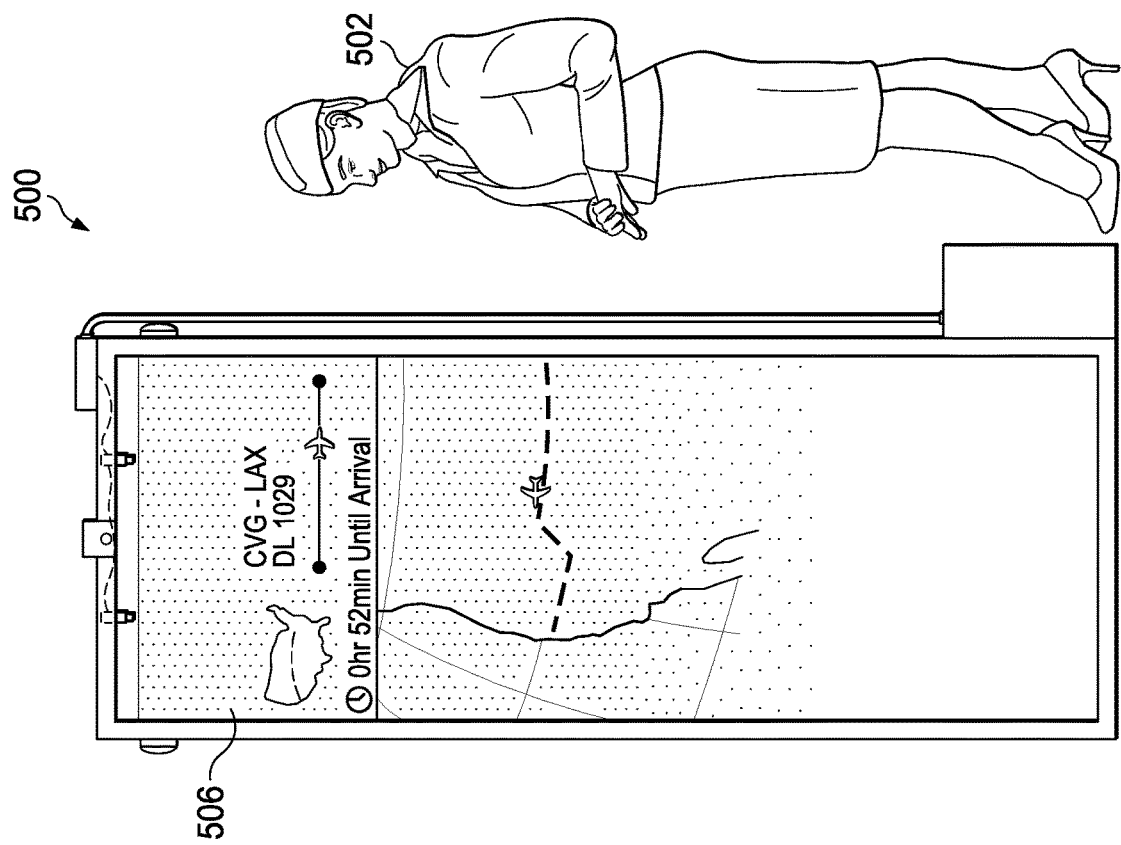
FIG. 5B depicts deactivation of the image projection on a dry mist in response to a control gesture in accordance with an illustrative embodiment.
Figure 7:
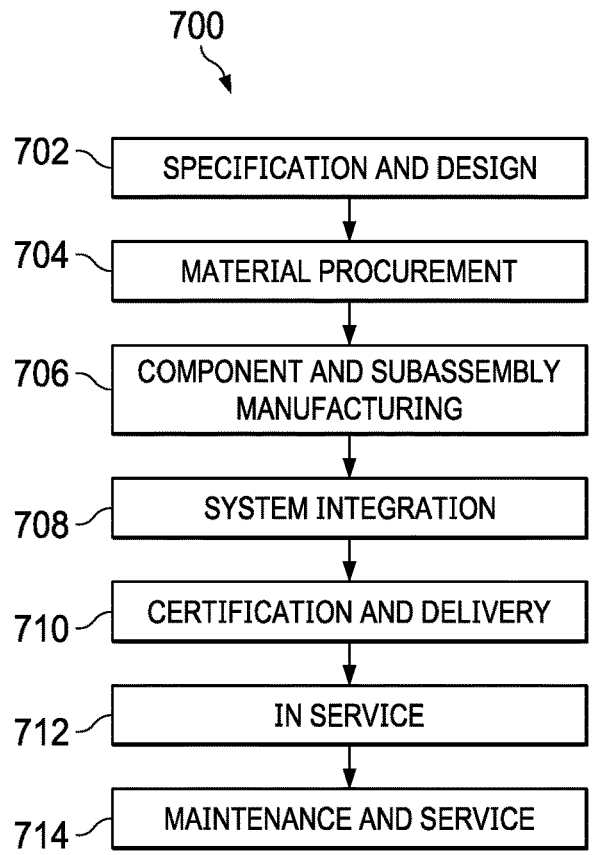
FIG. 7 is an illustration of an aircraft manufacturing and service method in a form of a block diagram in accordance with an illustrative embodiment.
Figure 8:
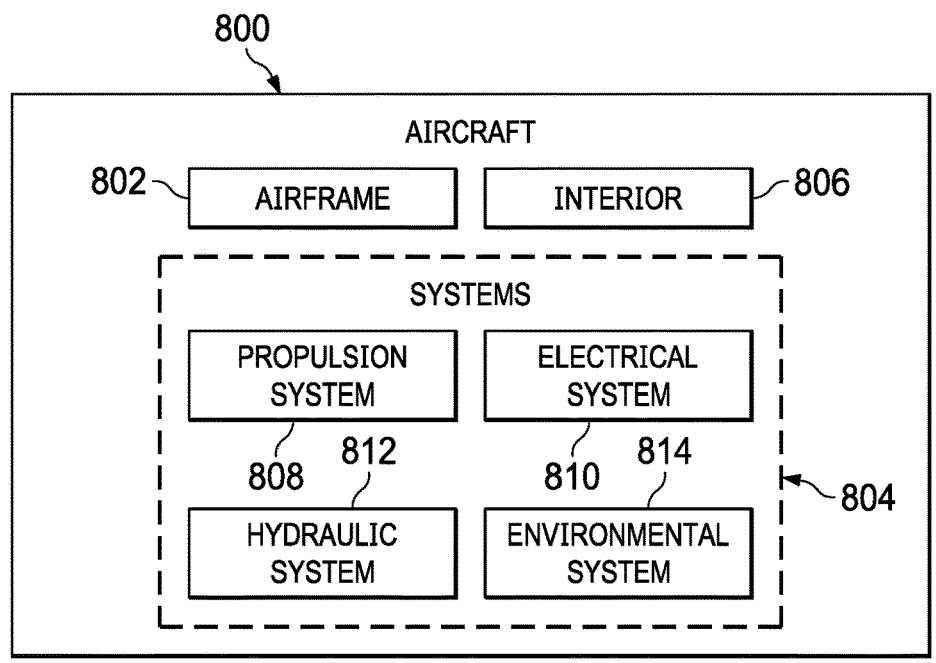
FIG. 8 is an illustration of an aircraft in a form of a block diagram in which an illustrative embodiment may be implemented.

FIG. 5A depicts a dry mist partition with an image projected on the mist in accordance with an illustrative embodiment. FIG. 5B depicts deactivation of the image projection on a dry mist in response to a control gesture in accordance with an illustrative embodiment. FIGS. 5A and 5B illustrate an example of the operation of a touchless-control interface such as touchless-control interface 226 in FIG. 2.

In FIG. 5A a visual display 506 is projected onto a dry mist in visual partition 500. In the present example, an image of the airplane's flight status and route is projected on the dry mist, thereby creating an opaque visual barrier. As shown in FIG. 5B, in response to a gesture by flight attendant 502, the image and dry mist are turned off.

FIG. 6 depicts a flowchart illustrating a process of creating a visual partition in an airplane cabin in accordance with an illustrative embodiment. Process 600 may be implemented using dry mist partition 208 in FIG. 2 and dry mist visual partition 300 shown in FIGS. 3 and 4.

Process 600 begins by generating a particle curtain from a number of dry mist dispensers (step 602). The particle curtain comprises micro-droplets of less than 10 microns in diameter. At least one aspect of the particle curtain can be controlled based on at least one flight characteristic of the aircraft in which it is installed. For example, the dry mist partition automatically may stop during take-off, landing, or emergencies.

Light is projected on the particle curtain with a light projector to render an opaque particle curtain (step 604). The light projector may project an image or video on the particle curtain to render it a graphical curtain, which may be modified based on at least one flight characteristic. The light projector may also project a solid color on the particle curtain, thereby rendering a colored particle curtain. As with the image projection, the color of the colored particle curtain may be modified based on at least one flight characteristic.

Process 600 continually monitors for modifying control input to the light projector (step 606). At least one aspect of the visual partition may be controlled via a touchless-control user interface. This control may include, e.g., turning the light projector on or off or changing the image or color projected onto the particle curtain by the projector. If a modify input is receive, the system modifies the light projection on the particle curtain (step 608).

Liquid from the particle curtain is continually collected (step 610) and may be filtered (step 612) before recirculating the fluid back to the dry mist dispensers. The liquid may be collected with a gutter system and at least one vacuum extractor operably coupled to the gutter system.

If the system is left on (step 614), the collected liquid is recirculated back to the dry mist dispensers (step 616). If an off signal is received, the system stops and process 600 ends.

Illustrative embodiments of the present disclosure may be described in the context of aircraft manufacturing and service method 700 as shown in FIG. 7 and aircraft 800 as shown in FIG. 8. Turning first to FIG. 7, an illustration of an aircraft manufacturing and service method is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance and service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft is depicted in which an illustrative embodiment may be implemented. In this example, aircraft 800 is produced by aircraft manufacturing and service method 700 of FIG. 7 and may include airframe 802 with plurality of systems 804 and interior 806. Examples of systems 804 include one or more of propulsion system 808, electrical system 810, hydraulic system 812, and environmental system 814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 700. One or more illustrative embodiments may be manufactured or used during at least one of component and subassembly manufacturing 706, system integration 708, in service 712, or maintenance and service 714 of FIG. 7.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A visual partition system, comprising:
   a number of dry mist dispensers that generate a particle curtain comprising liquid micro-droplets;
   a gutter system configured to collect liquid from the particle curtain;
   at least one vacuum extractor operably coupled to the gutter system; and
   a liquid recirculation system configured to collect liquid from the gutter system via the at least one vacuum extractor and return it to the dry mist dispensers for reuse of the liquid.

2. The visual partition system of claim 1, further comprising a light projector configured to project light onto the particle curtain to render the particle curtain opaque.

3. The visual partition system of claim 2, wherein the light projector is further configured to project an image or video on the particle curtain to render a graphical particle curtain.

4. The visual partition system of claim 2, wherein the light projector is further configured to modify the graphical particle curtain based on at least one flight characteristic of an aircraft on which the visual partition system is installed.

5. The visual partition system of claim 2, wherein the light projector is further configured to project colored light on the particle curtain render a colored particle curtain.

6. The visual partition system of claim 5, wherein the light projector is further configured to modify the color of the colored particle curtain based on at least one flight characteristic of an aircraft on which the visual partition system is installed.

7. The visual partition system of claim 1, further comprising a frame supporting the dry mist dispensers, gutter system, and vacuum extractor, such that the particle curtain is generally contained within an area defined by the frame when in operation.

8. The visual partition system of claim 1, further comprising:
   a controller for controlling the liquid recirculation system; and
   a touchless-control user interface communicatively coupled to the controller for user control of the visual partition system.

9. The visual partition system of claim 1, further comprising a controller for controlling the liquid recirculation system onboard an airplane, wherein the controller is communicatively coupled to an airplane system of the airplane for controlling the visual partition system based on at least one flight characteristic.

10. The visual partition system of claim 1, wherein the particle curtain forms a visual barrier between different sections of an aircraft cabin.

11. The visual partition system of claim 1, wherein the micro-droplets are less than 10 microns in diameter.

12. An airplane cabin partition system, comprising:
   a frame connected to an interior of an airplane cabin;
   a number of water dispensers connected to the frame, wherein the water dispensers dispense a dry mist curtain;
   a light projector that renders the dry mist curtain opaque by projecting light onto the dry mist;
   a gutter system coupled to the frame and configured to collect water from the dry mist;
   at least one vacuum extractor operably coupled to the gutter system, such that the dry mist curtain is generally contained within an area defined by the frame; and
   a water recirculation system configured to collect water from the gutter system via the at least one vacuum extractor and return it to the water dispensers for reuse of the water.

13. The airplane cabin partition system of claim 12, wherein the light projector is further configured to project an image or video on the dry mist curtain to render a graphical dry mist curtain.

14. The airplane cabin partition system of claim 12, further comprising a controller for controlling the water recirculation system onboard the airplane, wherein the control unit is communicatively coupled to an airplane system of the airplane for controlling the cabin partition system based on at least one flight characteristic.

15. The airplane cabin partition system of claim 12, further comprising a gesture-controlled user interface.

16. The airplane cabin partition system of claim 12, wherein the cabin partition forms a visual barrier between different sections of the airplane cabin.

17. The airplane cabin partition system of claim 12, wherein the dry mist comprises micro-droplets of less than 10 microns in diameter.

18. The airplane cabin partition system of claim 12, wherein the frame is detachably connected to the interior of an airplane cabin.

19. A method for creating a partition in an airplane cabin, the method comprising:
   generating a particle curtain from a number of dry mist dispensers;
   projecting light on the particle curtain with a light projector to render an opaque particle curtain;
   collecting liquid from the particle curtain; and
   recirculating the collected liquid back to the dry mist dispensers.

20. The method of claim 19, further comprising controlling at least one aspect of the particle curtain based on at least one flight characteristic.

21. The method of claim 19, further comprising controlling at least one aspect of the cabin partition via a touchless-control user interface.

22. The method of claim 19, wherein collecting the liquid further comprises collecting the liquid with a gutter system.

23. The method of claim 22, wherein the liquid is collected with at least one vacuum extractor operably coupled to the gutter system.

24. The method of claim 19, further comprising filtering the collected fluid before recirculating the fluid back to the dry mist dispensers.

25. The method of claim 19, wherein projecting light on the particle curtain further comprises projecting, with the light projector, an image or video on the particle curtain to render a graphical particle curtain.

26. The method of claim 25, further comprising modifying the graphical particle curtain based on at least one flight characteristic.

27. The method of claim 19, wherein projecting light on the particle curtain comprises projecting colored light on the particle curtain to render a colored particle curtain.

28. The method of claim 27, further comprising modifying the color of the colored particle curtain based on at least one flight characteristic.

29. The method of claim 19, wherein the particle curtain comprises micro-droplets of less than 10 microns in diameter.

* * * * *

UNITED STATES PATENT AND TRADEMARK OFFICE
CERTIFICATE OF CORRECTION

PATENT NO. : 11,619,874 B2
APPLICATION NO. : 17/446231
DATED : April 4, 2023
INVENTOR(S) : Cynthia Anne Vandewall et al.

It is certified that error appears in the above-identified patent and that said Letters Patent is hereby corrected as shown below:

In the Claims

Column 7 Line 34:
Change "particle curtain render a colored particlue curtain" to "particle curtain to render a colored particle curtain"

Column 8 Line 2:
Change "by projecting light onto the dry mist" to "by projecting light onto the dry mist curtain"

Signed and Sealed this
First Day of August, 2023

Katherine Kelly Vidal
*Director of the United States Patent and Trademark Office*